Jan. 1, 1929.

F. M. PATTERSON 1,697,608

VALVE

Filed March 6, 1925

INVENTOR
Franklin M. Patterson
BY
Synnestvedt + Lechner
ATTORNEYS

Jan. 1, 1929.
F. M. PATTERSON
1,697,608
VALVE
Filed March 6, 1925   2 Sheets-Sheet 2
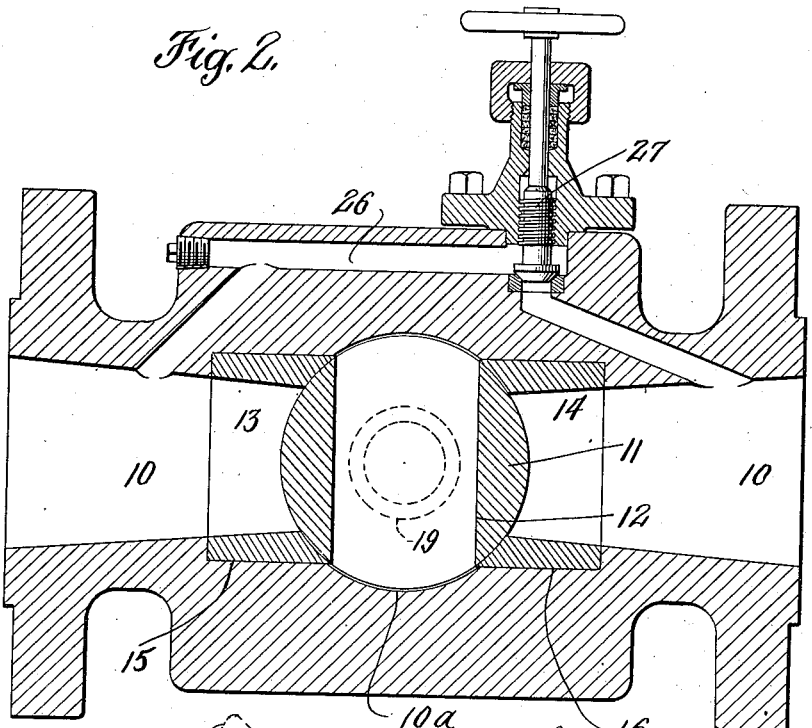
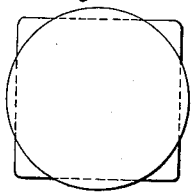
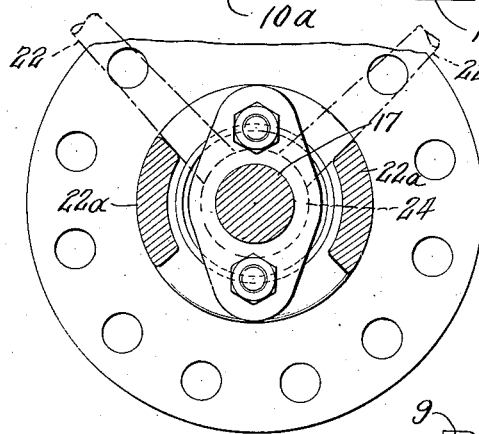
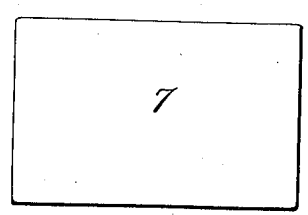
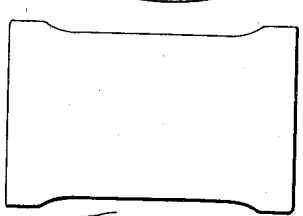
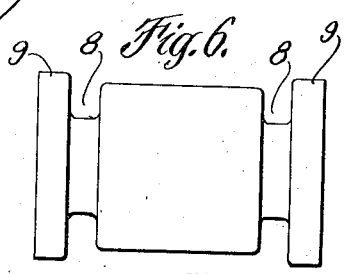
INVENTOR
Franklin M. Patterson
BY
Synnestvedt + Lechner
ATTORNEYS Patented Jan. 1, 1929.

1,697,608

UNITED STATES PATENT OFFICE.

FRANKLIN M. PATTERSON, OF PITMAN, NEW JERSEY.

VALVE.

Application filed March 6, 1925. Serial No. 13,426.

This invention relates to valves and is especially useful in valves for high pressure lines. In one aspect, my invention has to do with the provision of a forged steel valve. In other aspects, the invention has to do with other features of construction.

One of the objects of the invention is to provide a valve having an integral forged steel body or casing, to secure or combine lightness with the strength necessary to withstand high pressures.

Another object of the invention has to do with the provision of a method whereby such a valve body or casing may be forged and economically produced.

Still another object of the invention is to provide a valve construction by virtue of which a plug valve may be employed while still keeping within the overall face to face limitations of the A. S. M. E. specifications.

Still another object of the invention is to provide an improved means and arrangement whereby the valve may be easily moved.

A further object of the invention is to prevent the valve from locking.

My invention also contemplates such additional objects as the provision of an improved valve seat; the provision of an improved arrangement whereby "dragging" of the valve on its seat is prevented; and the provision of an improved and simple arrangement of parts, cutting down the amount of machining, avoiding difficulties with respect to accuracy of machining, and the like.

How the foregoing, together with such other objects and advantages as may hereinafter appear, or are incident to my invention, are realized, is illustrated in the accompanying drawings, wherein Fig. 1 is a section thru a valve embodying my improvements;

Fig. 2 is a plan section thru the valve of Fig. 1;

Fig. 3 is a section taken on the line 3—3 of Fig. 1 and

Figs. 4, 5, 6 and 7 are diagrammatic views illustrating the manner in which the valve body is formed.

Figure 1:
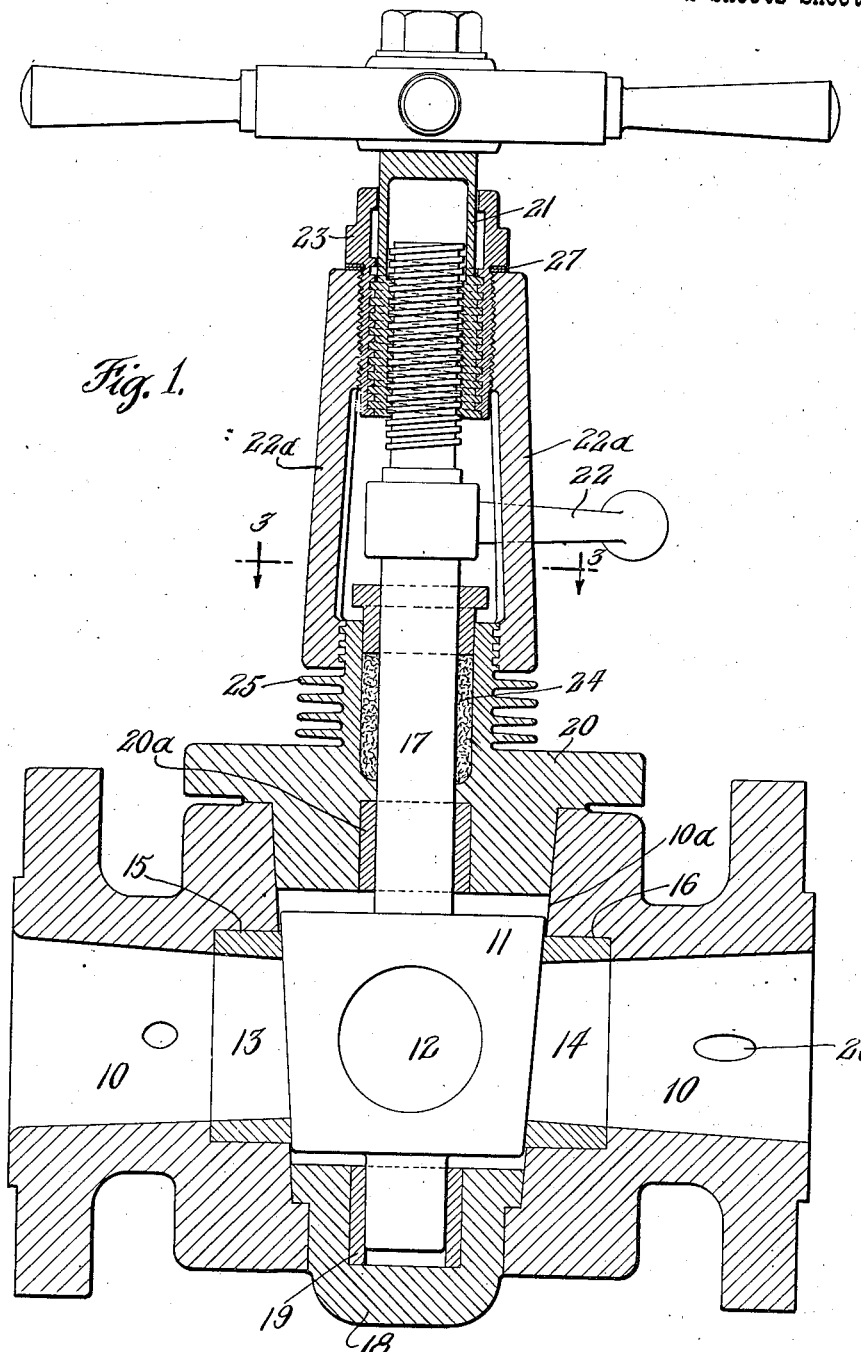

The desirability of a forged steel valve construction has long been realized but, in so far as I am aware, the only forged steel valve constructions heretofore employed have been composed of a plurality of parts welded together. Such parts are screw threaded and secured together, after which they are welded together. The construction is open to a number of objections such, for example, as the liability to leakage, the uncertainty of the character of the weld and the fact that it does not answer to required specifications, particularly for high pressure lines.

In making a forged steel valve body, I proceed as follows:

I take a round forged steel billet 7, such as indicated in Fig. 4, and swage the portion thereof intermediate its ends from a round cross section to a square cross section, such as shown in Fig. 5, and illustrated in Fig. 7 in end elevation. This swaging operation is carried only to the extent of displacing sufficient metal to fill the corners without elongation of the billet, the original billet 7 being of the required length. When the billet has been thus swaged, I machine off the grooves 8 so as to leave the flanges 9. These grooves may be "hogged" out by any suitable rough, hogging tools. I then hog out the longitudinal bore 10 and the valve bore 10ᵃ. The valve body thus provided is finally machined where needed as will further appear.

The integral valve body is characterized by extreme lightness, size for size, as compared with cast steel valve bodies; has greater strength than such cast steel valve bodies; will resist and withstand expansion and contraction with less liability to fracture; and the metal is more dense and is less liable to cut or leak because of this fact and also because there are no blow-holes or other defects such as are present in castings. Furthermore the net cost of manufacture is very greatly decreased for the reason that blow-holes or other defects in castings do not become manifest until the machining operations take place, and, while defective castings are usually replaced by the founder, the cost of machining falls on the valve manufacturer. The wastage and loss are very heavy as the amount of discards is great. The reduction in weight reduces the cost.

Referring now in Figures 1, 2 and 3 inclusive, it will be seen that the valve 11 is of the plug type and is provided with a round hole 12.

Such a plug valve is ordinarily not employed in steam lines for the reason that it is impossible to use a plug valve without exceeding the face to face limitations of the A. S. M. E. specifications. To overcome this difficulty and make possible the use of such a valve I make the main core 10 in the form of a vena-contracta or venturi. This keeps the size of the plug sufficiently small to provide the desired thickness of walls for the valve body while still keeping within the clearance limitations.

The opening 12 thru the valve proper constitutes the middle portion or throat of the vena-contracta when the valve is in open position. In the absence of the provision of the vena-contracta, the hole 12, instead of being round, would have to be elongated if it is to have the same capacity as the line, and still keep within the size limitations. Thus the vena-contracta enables me to use a small plug, in the first instance, and a round opening in the plug valve which, of course, it is much less expensive to make. Furthermore the employment of a round hole in the plug makes it possible for me to provide a very simple form of valve seat.

The valve seat consists of two bushings 13 and 14 pressed or rolled into seats 15 and 16 machined into the valve body. Perfect alignment of the seats 15 and 16 is not required by reason of my invention because I can ream the seat faces of the respective bushings 13 and 14 at one time by one tool inserted into the bore 10$^a$. Since the valve hole 12 is round, these bushings 13 and 14 may be of ordinary circular cross-sections. The advantages pointed out thus far as being incident to the construction already described will be manifest on comparing the device of the invention with devices such as shown in the Duffy Patent, No. 862,143.

To provide a bearing for the valve stem 17, on opposite sides of the valve 11, I press a bonnet 18 into the bottom portion of the bore 10$^a$ and provide it with a bushing 19, and I provide the cap 20 with a similar bushing 20$^a$. These two bushings centrally guide the valve stem and valve so that the pressure in the line does not cause the valve to drag over the bushings 13 and 14 in opening and closing the valve.

In operation, assuming that the valve is in the closed position indicated in Fig. 1, I first raise the valve to free it from its seat, then rotate it to bring the opening 12 into registry with the main bore, and then return the valve to its seat, at which position the opening 12 will be in true alignment with the main bore. It will thus be seen that the seat faces are always protected and are not subjected to the cutting action which is incident to the gate type of valve ordinarily employed in these steam lines. A slight lift of the valve will free it from its seat so that the clearance is correspondingly small which reduces the liability of any particles of matter lodging between the valve and its seat. It will be noted that the bottom of the stem is short of the bonnet whereby the valve will always seat, should the seat faces wear. In this connection, however, the seats will last for a long time for the reason that there is no drag nor is there the cutting action previously described.

In order to provide for the easy raising of the valve, I provide a sleeve 21 which is externally and internally threaded. The valve stem 17 is threaded within the sleeve, and the external and internal threads are of different pitch, as, for example, five threads to the inch for the valve stem and four threads to the inch for the external thread on the sleeve 21. By this arrangement I multiply the force applied, for while a complete revolution of the sleeve 21 will result in its being elevated $\frac{1}{4}$ of an inch, the valve will be lifted the difference between $\frac{1}{4}$ of an inch and $\frac{1}{5}$ of an inch. With the valve raised from its seat I turn the valve by means of the handle 22 to open or closed position as the case may be, and then return the valve to its seat as previously described. In order to prevent jamming of the upper face of the valve against the bottom face of the cap 20, the length of the cap 23, within which the sleeve 21 is threaded, is such that the threads on the sleeve will come against the top of the cap before the upper face of the valve contacts with the lower face of the cap 20.

The valve stem 17 is packed as indicated at 24, and in order to protect the packing against excessive heating I provide radiating fins 25 to carry off the heat.

Another important and advantageous feature of the invention is that I am enabled to employ a by-pass formed in the valve body. This by-pass is indicated at 26 and is formed by drilling holes in the wall of the valve body. This may be safely done with a forged steel valve body because of its strength and density and the absence of blow and sand holes as in castings. The by-pass is controlled by the valve 27 and is used to warm up the line, and equalize the pressure on both sides of the plug.

In steam lines, particularly high pressure steam lines, because of the temperature and the changes in temperature, there is an objectionable tendency of cast steel valve bodies to "grow" which is not the case with the valve body of my invention.

The bushings are preferably made of Monel metal.

The sleeve 23 is threaded into position and is adjustable as by means of the employment of multiple washers 27, the number of which may be added to or diminished. It will be noted that the threads of the lifting device are all the same, i. e., they are right threads. It is obvious that left threads could also be used instead of all right threads.

To always insure registry of the valve in full open and full closed position it will be seen by inspection of Fig. 3 that the legs 22ª of the cap 20 form abutments cooperating with the valve handle 22 to limit the amount of turning movement of the valve in either direction. With the handle 22 in its right hand position (as indicated in dot and dash lines) the valve is in full closed position, as shown in Figs. 1 and 2, and with the handle in its left hand position the valve is full open, that is, in position to constitute the throat of the vena-contracta.

I claim:

1. A valve device including a valve, a stem therefor externally threaded, an operating sleeve having an internal right thread and an external right thread of different pitch, and a member in which the sleeve is threaded, said member being adjustable.

2. A valve device including a valve, a stem therefor externally threaded, an operating sleeve having an internal right thread and an external right thread of different pitch, and a member in which the sleeve is threaded having a stop to prevent jamming of the valve.

In testimony whereof, I have hereunto signed my name.

FRANKLIN M. PATTERSON.